US005731923A

United States Patent [19]
Sakuma

[11] Patent Number: 5,731,923
[45] Date of Patent: Mar. 24, 1998

[54] MEDIUM RECORDING APPARATUS AND MEDIUM REPRODUCING APPARATUS, AND MEDIUM RECORDING METHOD AND MEDIUM REPRODUCING METHOD, AND MEDIUM USED THEREFOR

[75] Inventor: Hiroto Sakuma, Fukushima, Japan

[73] Assignee: Nippon Columbia Co., Ltd., Tokyo, Japan

[21] Appl. No.: 722,891

[22] Filed: Sep. 23, 1996

[30] Foreign Application Priority Data

Oct. 5, 1995 [JP] Japan ................................. 7-284597
Jul. 3, 1996 [JP] Japan ................................. 8-192860

[51] Int. Cl.$^6$ ........................... G11B 15/18; G11B 5/82
[52] U.S. Cl. ........................... 360/69; 360/71; 360/135
[58] Field of Search ........................... 360/55, 69, 71, 360/72.1, 72.2, 131, 135, 97.01, 98.01, 98.04, 98.05; 358/296

[56] References Cited

U.S. PATENT DOCUMENTS

| | | | |
|---|---|---|---|
| 5,070,419 | 12/1991 | Kiyonaga | 360/72.2 |
| 5,341,356 | 8/1994 | Dieleman et al. | 360/72.2 X |
| 5,363,364 | 11/1994 | Torazawa et al. | 360/55 X |
| 5,661,848 | 8/1997 | Bonke et al. | 360/69 X |

FOREIGN PATENT DOCUMENTS

| | | |
|---|---|---|
| 0 552 806 A2 | 7/1993 | European Pat. Off. |
| 5-250794 | 9/1993 | Japan. |
| 5-334805 | 12/1993 | Japan. |
| WO92/12515 | 7/1992 | WIPO. |

*Primary Examiner*—Eric Frahm
*Attorney, Agent, or Firm*—Dickstein Shapiro Morin & Oshinsky LLP

[57] ABSTRACT

In a recording and reproducing apparatus capable of continuously recording to and reproducing from a plurality of media, the recording and reproducing apparatus includes a recording and reproducing device for recording data to and reproducing it from the medium and a controller for performing edition such as deleting, connecting, and separating the recorded data. The recording and reproducing device performs continuous recording by recording first connecting information including information indicating that the recorded data is recorded over at least two of the media (for example, ID indicating medium in origin of connection, track number in origin of connection, track number in destination of connection) and second connecting information (for example, ID indicating medium in destination of connection, track number in origin of connection, track number in destination of connection) into index information on the medium, and performs continuous reproducing of the recorded data by reading the recorded data and connecting information from the medium.

9 Claims, 10 Drawing Sheets

FIGURE FOR EXPLAINING UTOC MD

FIG.3

FIGURE FOR EXPLAINING FORMAT OF UTOC SECTOR

FLOW-CHART SHOWING READING UTOC DATA OF EACH MD AND PRODUCING MD MANAGEMENT INFORMATION TABLE

FIG.5

| MD STORING POSITION | DISC-ID | FIRST CONNECTING INFORMATION | SECOND CONNECTING INFORMATION | TOTAL NUMBER OF RECORDED TRACKS |
|---|---|---|---|---|
| 1 | 7 | 0.0.0 | 0.0.0 | 0 |
| 2 | 4 | 0.0.0 | 0.0.0 | 0 |
| 3 | 15 | 0.0.0 | 0.0.0 | 0 |
| 4 | 8 | 0.0.0 | 0.0.0 | 0 |
| 5 | 32 | 0.0.0 | 0.0.0 | 0 |

MD MANAGEMENT INFORMATION TABLE AFTER INSERTING MD

FIG.8

| MD STORING POSITION | DISC-ID | FIRST CONNECTING INFORMATION | SECOND CONNECTING INFORMATION | TOTAL NUMBER OF RECORDED TRACKS |
|---|---|---|---|---|
| 1 | 7 | 0.0.0 | 5.4.1 | 5 |
| 2 | 4 | 1.7.5 | 0.0.0 | 1 |
| 3 | 15 | 0.0.0 | 0.0.0 | 0 |
| 4 | 8 | 0.0.0 | 0.0.0 | 0 |
| 5 | 32 | 0.0.0 | 0.0.0 | 0 |

MD MANAGEMENT INFORMATION TABLE AFTER RECORDING

FLOW-CHART SHOWING RECORDING OPERATION

FIG.9

FLOW-CHART SHOWING REPRODUCING OPERATION

FIG.10

FIGURE EXPLAINING INTERMITTENTLY READING TO MEMORY CIRCUIT

FIG.11

MEDIUM RECORDING APPARATUS AND MEDIUM REPRODUCING APPARATUS, AND MEDIUM RECORDING METHOD AND MEDIUM REPRODUCING METHOD, AND MEDIUM USED THEREFOR

BACKGROUND OF THE INVENTION

1. Field of the Invention

The present invention relates to a medium recording apparatus and a medium reproducing apparatus of a recordable and reproducible medium such as an optical disk or the like, and a medium recording method and a medium reproducing method, and medium used therefor.

2. Description of the Prior Art

A magneto-optical disk, which is a recordable and reproducible disk medium, has been widely used as an MD (mini-disk). A recording and reproducing method of the MD employs a magnetic field modulating method capable of over-writing, and recording is performed by modulating magnetic field.

The specification of the disk is that the diameter is 64 mm, the maximum recording/reproducing capacity is audio data of 74 minutes with track pitch of 1.6 µm, the address (disk address) recording is every 13.3 ms with wobbled pre-groove. The linear speed of disk is 1.2 to 1.4 m/second. The performance of audio signal is that the number of channels is 2 channels for stereo, the frequency band is 5 to 20 kHz, the dynamic range is 105 dB,the signal format is standard frequency of 44.1 kHz, the modulation method is EFM (Eight to Fourteen Modulation) as the same as CD, the error correction method is ACIRC (Advanced Cross Interleave Reed-Solomon Code).

Further, the construction has a shock-proof function using a data compression and expansion technology combining with a memory circuit, a function for reproducing data recorded in random into continuous data, and various kinds of editing functions. Therefore, ATRAC (Adaptive Transform Acoustic Coding) is employed as the high performance encoding method, analog-digital converted audio data is divided with time frame of 11.6 ms at maximum, separated into a plurality of frequency bands using MDCT (Modified Discrete Cosine Transform) calculation, and transformed into frequency axis using MDCT, then compressed to a data amount of approximately one-fifth by thinning out the data in taking advantage of human hearing characteristic. Therefore, although the recording density on the MD is the same as that of the CD, the diameter of the mini-disc required for recording and reproducing the same time period can be decreased to 64 mm and is extremely smaller than the diameter of the CD.

The aforementioned MD is rotatably contained in a cartridge having size of 68 mm×72 mm×5 mm.

When data recorded in the MD, for example, sound signals are reproduced (sound output state), reproduced signals from an optical pickup are demodulated by a demodulating circuit and stored in a memory circuit by a compressed data form of MD format. The compressed data stored in the memory circuit of a buffer memory is read out to transmit to an expanding circuit for expanding the compressed data, and the compressed data is expanded to sound signal data to be outputed by the expanding circuit to be converted into sound signals. Since the recorded/reproduced information is compressed to approximately one-fifth in the MD format, the compressed signals read out with 1.4M bits/second is demodulated with 0.3 bit/second. Therefore, by storing the compressed data in the memory circuit, the sound signal corresponding to the stored data can be reproduced.

For example, on an occasion that the optical pickup is displaced from its correct trace position due to vibration or the like, in a case of a CD, sound is discontinued during a period until the pickup returns again to the trace position. However, in a case of an MD, the discontinuation of sound does not take place because the compressed data stored in the memory circuit is demodulated and reproduced. When a vibration is applied, the optical pickup is returned to the position where the discontinuation of sound has taken place to continue reading-out the signals while the compressed data is being read out of the memory circuit to output the sound. Thus, the discontinuation of sound does not take place.

When sound signals are recorded, the sound is continuously recorded in such a manner that compressed data to be recorded is read out of the memory circuit to record it to an MD before the capacity of the memory circuit becomes full. On an occasion of recording, recording to the MD is controlled so that the compressed data not having been recorded yet may not accumulated in the memory circuit (so that the memory circuit becomes empty), on the contrary of the occasion of reproducing.

In the past, recording to an MD and reproducing from an MD has been performed in such a manner as described above.

According to a conventional MD recording and reproducing apparatus, although connection of two pieces of music can be easily performed as far as music editing work is performed within a single medium, but the editing takes a long time since two successive pieces of music must be arranged into one piece of music by editing operation. Further, in a case where a piece of music having a certain length is recorded to or reproduced from an MD1 and the recording time or the reproducing time is too long to record to or reproduce from one MD1, it is natural that the music must be successively recorded to another MD1 or a second MD continuously recorded the music must be selected to perform continuous reproduction.

There are two types of maximum MD playing time, 60 minute-type and 74 minute-type depending on the linear speed. When music having a playing time exceeding these value is recorded or reproduced, the recording or reproducing has been performed by extracting another MD arranged in an MD changer. The maximum recording time per MD has been determined based on that the longest playing time of orchestra music is shorter than 74 minutes. Therefore, it has not been considered to continuously record or reproduce opera music or the like of which the playing time exceeds the maximum playing time.

In general, an operator select an MD and loads it on an MD recording and reproducing apparatus every time it is required. Therefore, there is an operating problem in that continuous automatic recording and automatic reproducing cannot be performed.

Particularly, in the past, it has been impossible to perform such an operation that a piece of music is continuously recorded on a second MD by changing from a first MD in the middle of the music play.

SUMMARY OF THE INVENTION

An object of the present invention is to provide a medium recording apparatus and a medium reproducing apparatus, and a recording and reproducing method, and a medium used for the apparatus such as MD which can eliminate the aforementioned problems and inconvenience, and is capable of performing continuous recording and reproducing over two or more media, and have an excellent operability.

Another object of the present invention is to provide an optical medium recording and reproducing apparatus which can prevent an erroneous operation such as an erroneous editing of data recorded over plural optical media.

In a medium recording apparatus in accordance with the present invention in which a plurality of block of data in a user area of a medium and recording index information of said recorded data in an index area other than said user area of the medium, the medium recording apparatus comprises first recording means for recording first connecting information including information indicating that said recorded data is recorded over at least two of said media and information indicating the second medium to which connective data is recorded in said index area of the first medium, second recording means for recording second connecting information including information indicating that connection from the first medium exists and information identifying the first medium in said index area of the second medium, and third recording means for successively recording the block of data on the second medium.

According to the medium recording method in accordance with the present invention, if it is judged that recording area is not left in the user area during recording data in the user area, the index information indicating that the data is recorded over two or more media is recorded in the index area and the next medium is loaded to restart recording the index information and the data.

In a medium reproducing apparatus in accordance with the present invention, in which first reading means for reading first connecting information including information indicating that said data is recorded over at least two of said media and information indicating the second medium to which connective data is recorded from said index area of the first medium, second reading means for reading second connecting information including information indicating that connection from the first medium exists and information identifying the first medium from said index area of the second medium, selecting means for selecting the second medium during reproducing said recorded data of the first medium, and reproducing means for continuously reproducing the recorded data of the second medium selected by said selecting means.

According to the medium reproducing method in accordance with the present invention, if it is judged that reproducing area is not left in the user area during reproducing data in the user area, the index information indicating that the data is reproduced over two or more media is reproduced from the index area and the next medium is loaded to restart reproducing the index information and the data.

According to the present invention, it is possible to perform continuous ling-time recording and reproducing, and it is possible to obtain an apparatus or a method of recording and reproducing in which music is not interrupted in the middle of playing. That is, according to the present invention, even in a recording and reproducing apparatus or a recording and reproducing method or media using an auto-changer containing a plurality of media inside apparatus, it is possible to automatically recording and reproducing data continuously recorded over a plurality of media for a long time, and it is also possible to improve the operability since it is no need to consider the maximum recording time or the maximum reproducing time per medium. Further, since the system controller automatically controls the connection states over a plurality of media, it is possible to obtain a high reliable apparatus, a method and media.

Another characteristic of the present invention is a medium recording and reproducing apparatus comprising recording and reproducing means for recording to and reproducing from a medium and control means for editing such as deleting, connecting, separating and so on; said recording and reproducing means reproducing recorded data and connecting information including information indicating that said recorded data being recorded over at least two media from said medium, said control means stopping said editing when a block of said data is recorded over at least two optical media based on said connecting information.

According to the characteristic of the present invention, it is possible to provide an optical medium recording and reproducing apparatus which can prevent an operating error such as an error in editing record recorded over plural optical media.

DETAILED DESCRIPTION OF THE PREFERRED EMBODIMENTS

An embodiment of a mini-disc recording and reproducing apparatus in accordance with the present invention will be described in detail below. The mini-disc recording and reproducing apparatus capable of recording and/or reproducing has five mini-discs (MD) 1 contained in an auto-changer as a plurality of optical media used in an optical medium recording and reproducing apparatus of the present invention.

Figure 1:
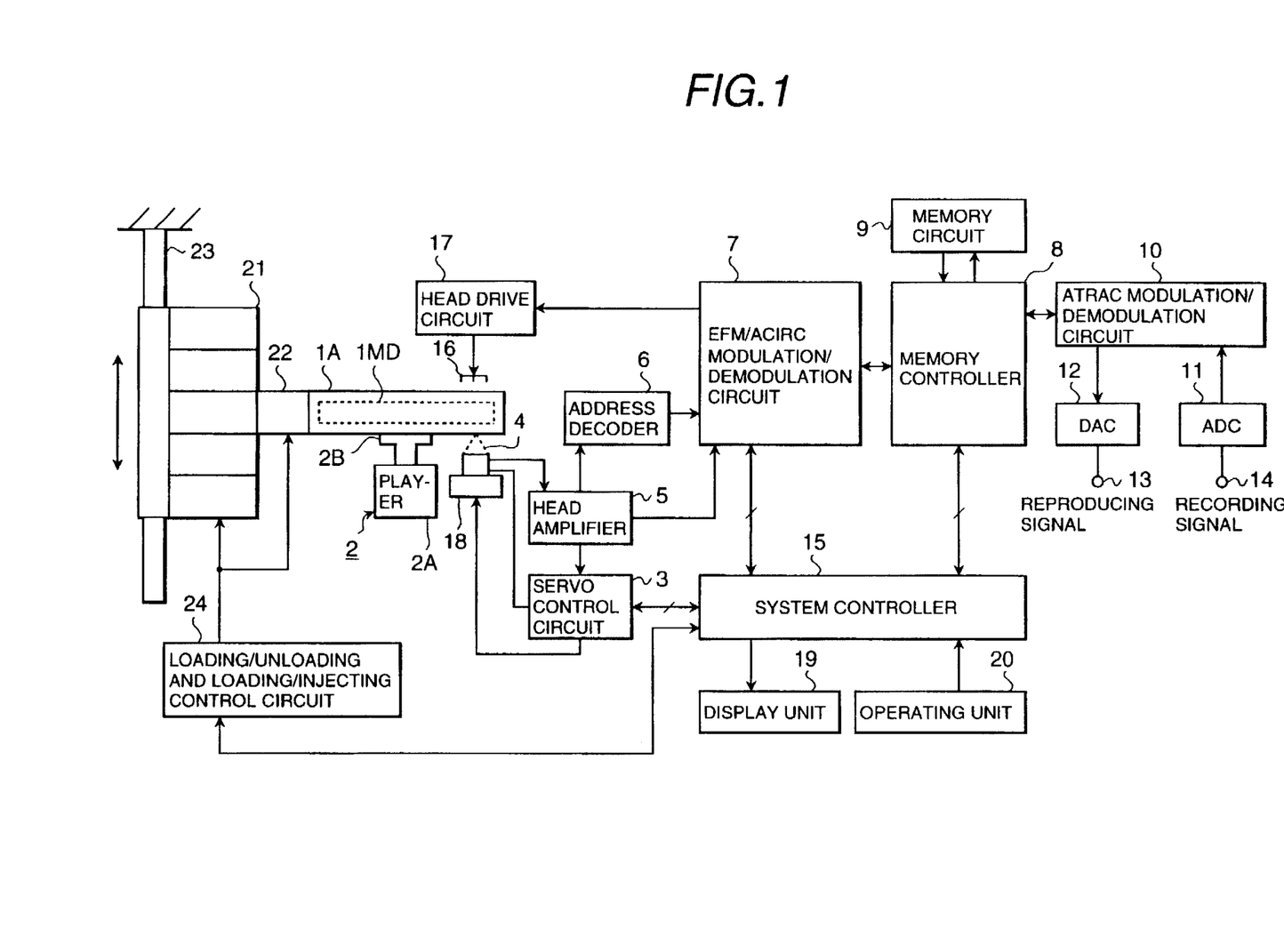
FIG. 1 is a system diagram showing an embodiment of a medium recording and reproducing apparatus in accordance with the present invention.

FIG. 1 is a system diagram showing an embodiment of a medium recording and reproducing apparatus in accordance with the present invention.

The embodiment of the recording and reproducing apparatus using MD's as media has a plurality of MD's, that is, five cartridges 1A containing MD 1 contained in an MD storage 21 in FIG. 1, and performs loading operation by selecting one of the cartridges 1A from the MD storage 21 and loading it on a turn table 2B through an MD loading and unloading portion 22 or injecting operation by containing an MD from the turn table 2B to the MD storage 21. The control for the loading and injecting operation and moving the MD storage 21 along a guide shaft 23 in the vertical direction shown by an arrow is performed by a loading /unloading and loading/injecting control circuit 24 through a system controller 15.

A servo control circuit 3 controls a slide motor 18 and a spindle motor 2A, and reproduced signal read out from the MD 1 by an optical pickup 4 is amplified by a head amplifier 5 and demodulated by an EFM (Eight to Fourteen Modulation)/ACIRC modulation/demodulation circuit 7. Then, the demodulated compressed data is accumulated in a memory circuit 9 of a buffer memory by a memory controller 8, and successively demodulated by an ATRAC modulation/demodulation circuit 10, and converted from digital signals to analog signals by a DAC (Digital Analog Converter) 12 to output reproduced signals from an output terminal 13.

On the other hand, recording signal is converted from analog signals to digital signals by an ADC (Analog Digital Converter) 11, and compressed data compressed by the ATRAC modulation/demodulation circuit 10 is modulated by the EFM/ACIRC modulation/demodulation circuit 7 through the memory controller 8, and recorded in the MD 1 through a magnetic head dive circuit 17 and a magnetic head 16. The system controller 15 such as a microcomputer controls the memory controller 8, the EFM/ACIRC modulation/demodulation circuit 7, the servo control circuit 3, the loading/unloading and loading/injecting control circuit 24. Instruction of edition is performed through an operating unit 20 connected to the system controller 15, and a display unit 19 displays recording/reproducing information, track information and so on.

Figure 2:
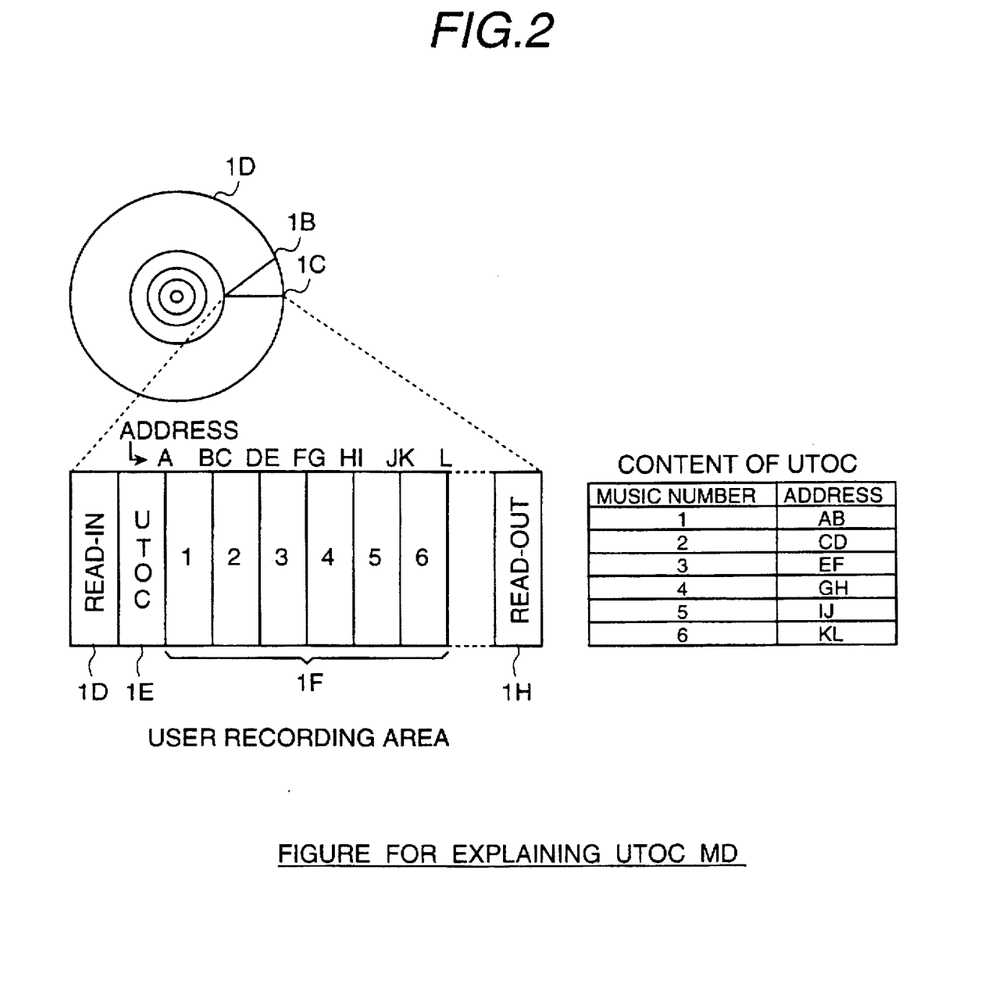
FIG. 2 is a view explaining UTOC of an MD.

Format recorded in the track of the MD 1 used in the present embodiment is constructed as shown in FIG.2. That is, there are arranged a read-in (pre-pit portion) in the innermost portion 1B of the MD 1, a UTOC area 1E, a user recording area 1F for recording sound or the like and a read-out 1H in the outermost periphery of the MD 1. In the user recording area 1F, there are provided addresses A to L for individual music numbers 1 to 6 as shown in the table in right hand side. In the UTOC area 1E, there is recorded index information of addresses of the track (music) recorded on the recording area 1F.

Figure 3:
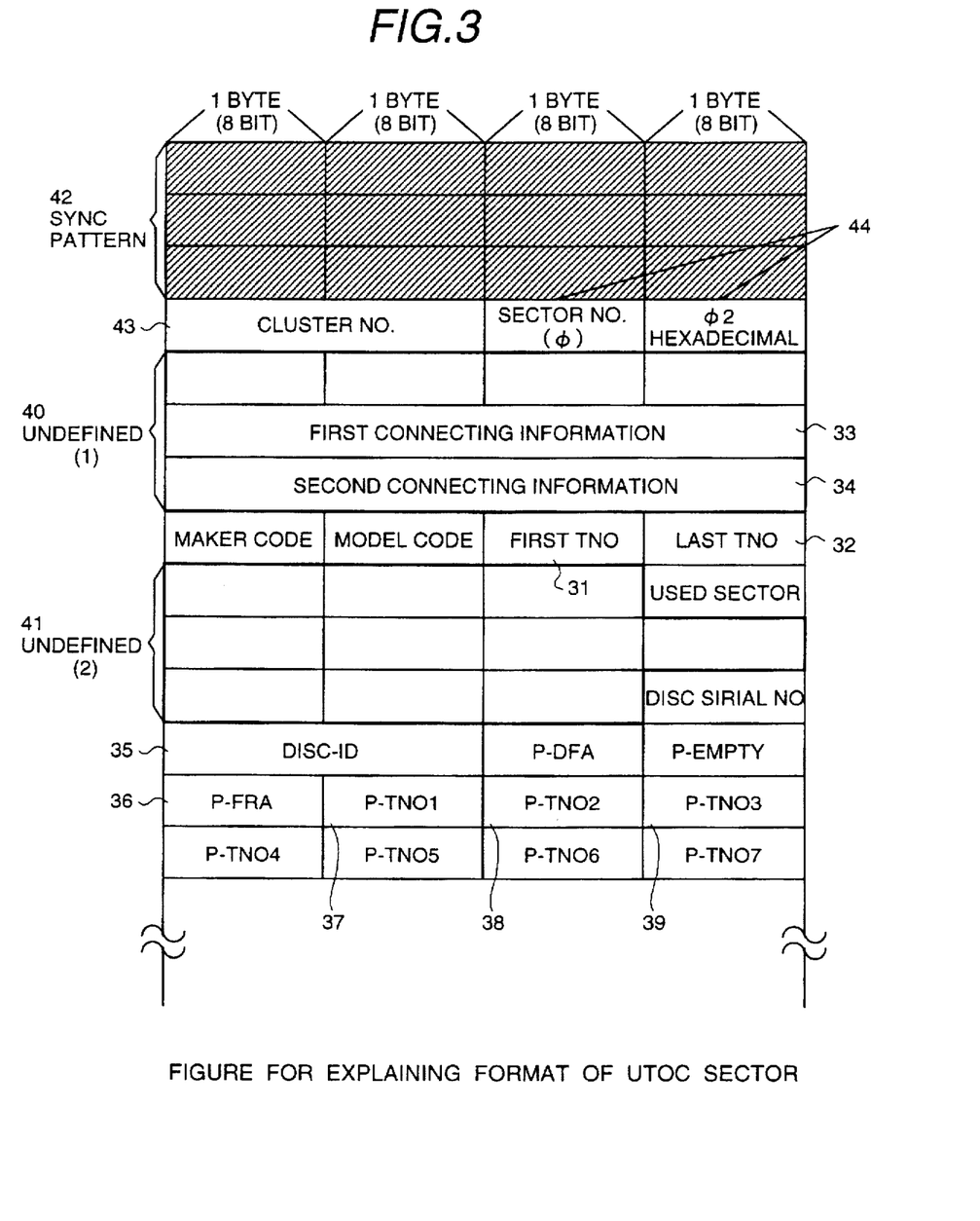
FIG. 3 is a view showing a format of UTOC Sector 0.

The detailed format of the above UTOC area 1E is constructed as shown in FIG. 3. FIG. 3 is a format of Sector 0 (1 sector is 2352 bytes) in the UTOC area. In general, 36 sectors compose 1 cluster, and 32 sectors are used for compressed data for user.

In FIG. 3, First TNO (31) indicates the first track number of an MD inserted in the MD recording and reproducing apparatus, and Last TNO (32) indicates the last track number.

Since the track number is sequential, (Last TNO –First TNO +1) is total number of tracks registered in the MD 1. The first track is usually track number 1. DISC-ID 35 is ID number of the MD. There is no MD having the same ID.

However, when the MD recording and reproducing apparatus does not have this function, all of the position are set to "0". That is, this function is an optional function. When the MD recording and reproducing apparatus has this optional function, ID's from 1 to 65535 can be registered. The present invention is based on the condition of an MD having the optional function.

P-FRA (36) is a pointer of recordable area, and physical address information is stored in a part-slot, not shown, indicated by the pointer. Similarly, pointers are stored in P-TNO 1 (37), P-TNO 2 (38), P-TNO 3 (39), and physical addresses are stored in part-slot indicated by the pointers. The areas shown by reference characters 40 and 41 are undefined areas, and all the areas are usually filled with "0". Therefore, there is no effect even if the areas are filled with data other than "0". Further, this embodiment is constructed so that first connection information 33 and second connection information 34 are recorded in and/or read from the undefined 1 area 40.

There are a sync pattern area 42, a cluster number area 43 and a sector number area 44 in the upper side of the undefined 1 area 40.

Figure 4:
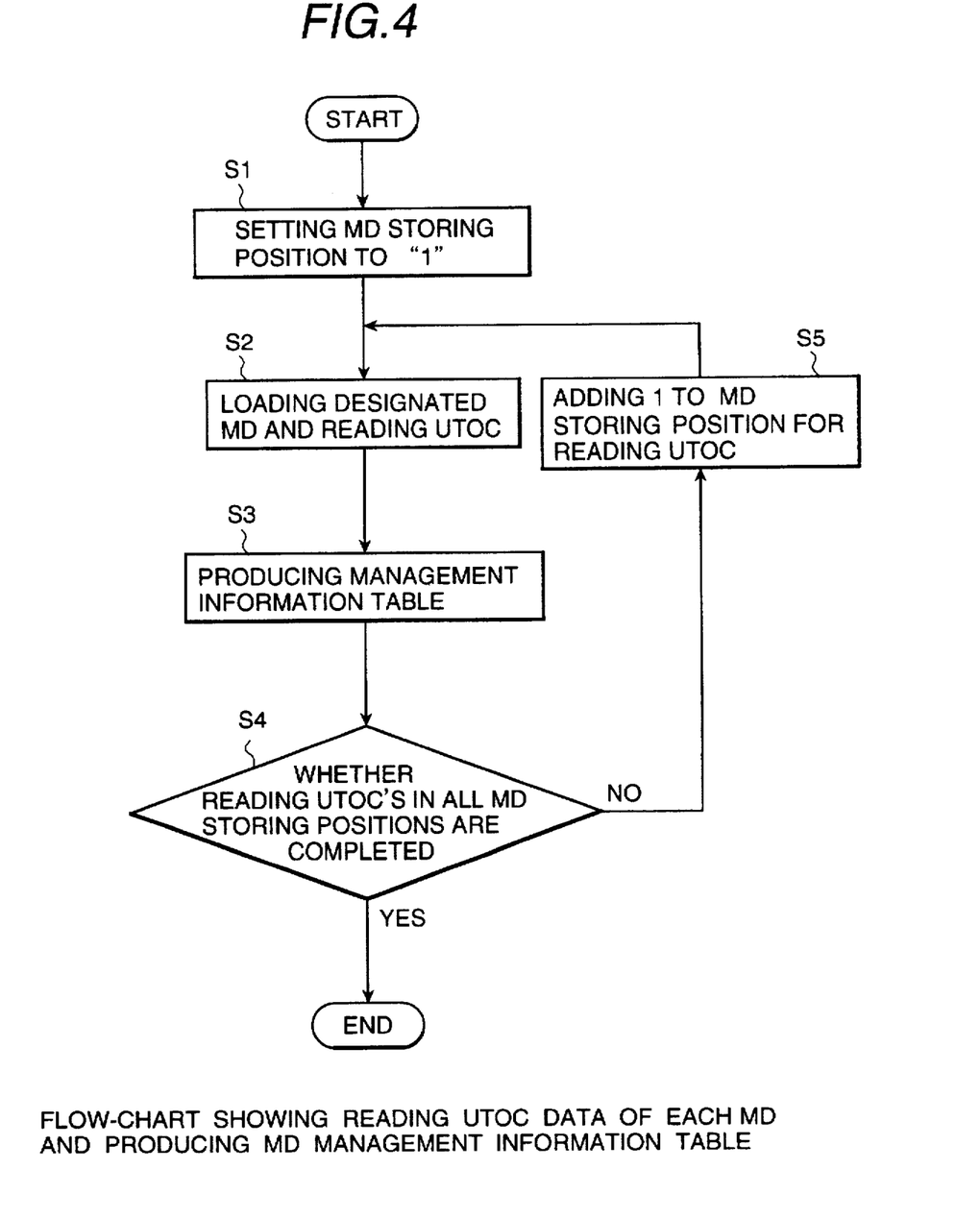
FIG. 4 is a flow-chart showing reading UTOC data of each MD and producing MD management information table.

In order to confirm each MD storing position of the plurality of the MD's contained in the MD storage 21 at the time when power is applied to the MD recording and reproducing apparatus, the MD storing position is set to an initial state, that is, the MD storing position is set to "1", as shown in the 1st step S1 in FIG. 4.

In the 2nd step S2, the system controller 15 controls the MD storage 21 and the MD loading/unloading portion 22 through the loading/unloading and loading/injecting control circuit 24 to load an MD designated from the operating unit 20 on the turn table 2B of the player 2 and successively read UTOC 1E. The UTOC 1E data is input to the system controller 15.

In the 3rd step S3, an MD management information table is produced. Such an MD management information table is shown in FIG.5.

Figure 5:
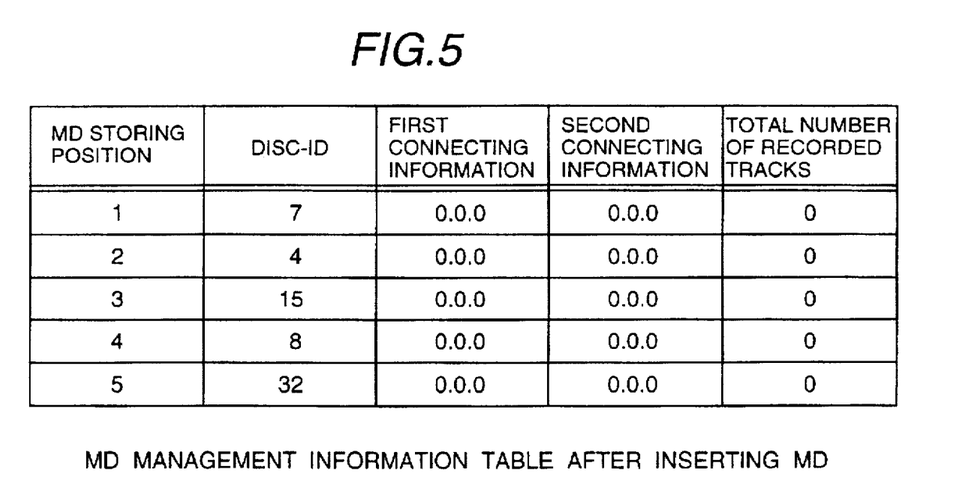
FIG. 5 is an explanatory figure showing an MD management information table after inserting an MD.

Referring to FIG. 5, when the MD storing positions for five MD 1 contained in the MD storage 21 are sequentially set to 1, 2, 3, 4 and 5, and the DISC-ID's given to the respective MD's 1 are set to, for example, 7, 4, 15, 8 and 32, all the first connecting information (33 in FIG. 3) and the second connecting information (34 in FIG. 3) and the number of recorded tracks for the five MD's 1 to be registered in this embodiment, which will be described later, are set to "0".

The purpose to produce such an MD management information table is to have the system controller 15 recognize parameters to each of the MD storing positions. DISC-ID is specified ID number of MD 1 described above, and the contents of the first connecting information and the second connecting information are shown in FIG. 6A and FIG. 6B.

That is, the first connecting information and the second connecting information are constructed with 4 bytes as described in FIG. 3, and composed of a parameter indicating which track (music) connects to which track in plural MD's, and a parameter indicating which track is connected from which track of which MD.

In summarizing, as shown in FIG. 6A and FIG. 6B, the first connecting information includes (1) connected track number (track number in destination of connection), (2) connecting disc ID (disc ID in origin of connection), and (3) connecting track number (track number in origin of connection).

The second connecting information includes (1) connecting track number (track number in destination of connection), (2) connected disc ID (disc ID in destination of connection), and (3) connected track number (track number in destination of connection).

Figure 6:
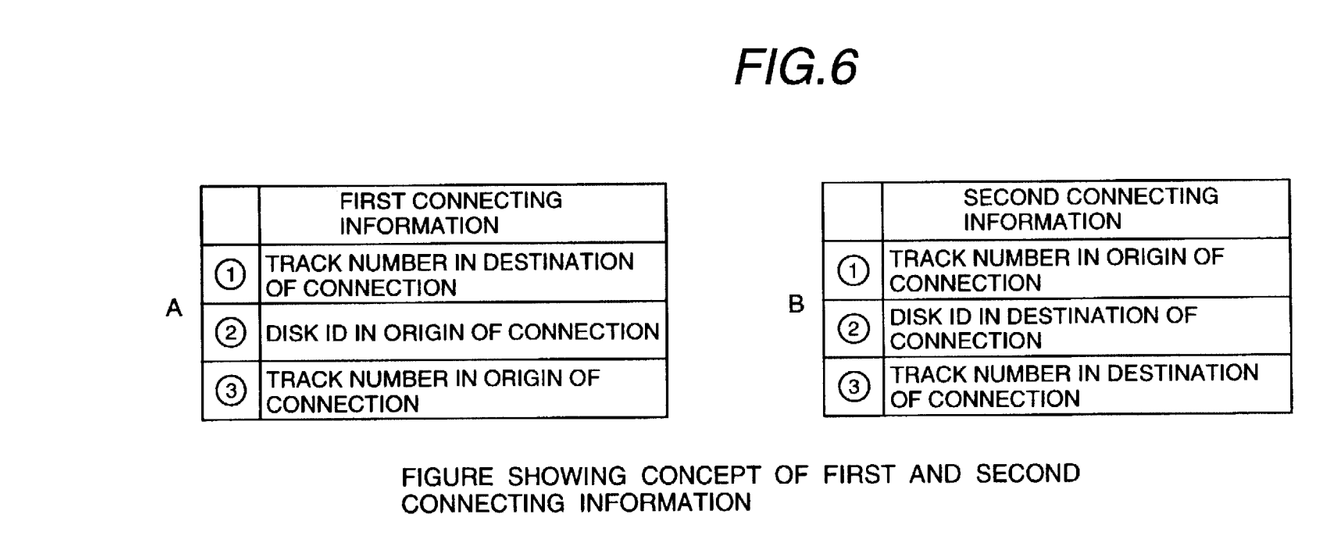
FIG. 6 is an explanatory figure showing a first and a second connecting information tables.

When an MD is not connected from any other MD and does not connect to any other MD, the connection information becomes all "0's" as shown in FIG. 6.

Returning to FIG. 4, when the produced MD management information table is stored in a RAM or the like in a CPU, not shown, of the system controller 15, the processing proceeds to the 4th step S4. In the 4th step S4, it is judged whether UTOC's 1E in all of the MD storing positions are completed. If not, the processing proceeds to the 5th step S5.

In the 5th step S5, 1 (one) is added to the MD storing position for reading the UTOC 1E and the processing is returned to the 2nd step S2 to repeat the same processing. If the 4th step S4 is YES, the processing of FIG. 4 is completed.

As described above, by producing the MD management information table by reading the UTOC's 1E of plural MD's as shown in FIG. 5, the system controller 15 can integrally manage the information of the plural MD's contained in the MD storage 21.

Operation of data recording in this embodiment will be described below, referring to a flow-chart of FIG. 7 and an MD management information table after recording of FIG. 8.

Now, assuming that all of the five MD's are is a NO-track state (a state where there is no recorded track), the MD to which data is to be recorded first is an MD in the MD position 1 (DISC-ID 7), and the MD in the storing position 2 is loaded to be recorded if the MD in the MD position 1 becomes fully recorded, and then successively the MD's in the storing positions 3, 4, 5 are loaded to be recorded.

Figure 7:
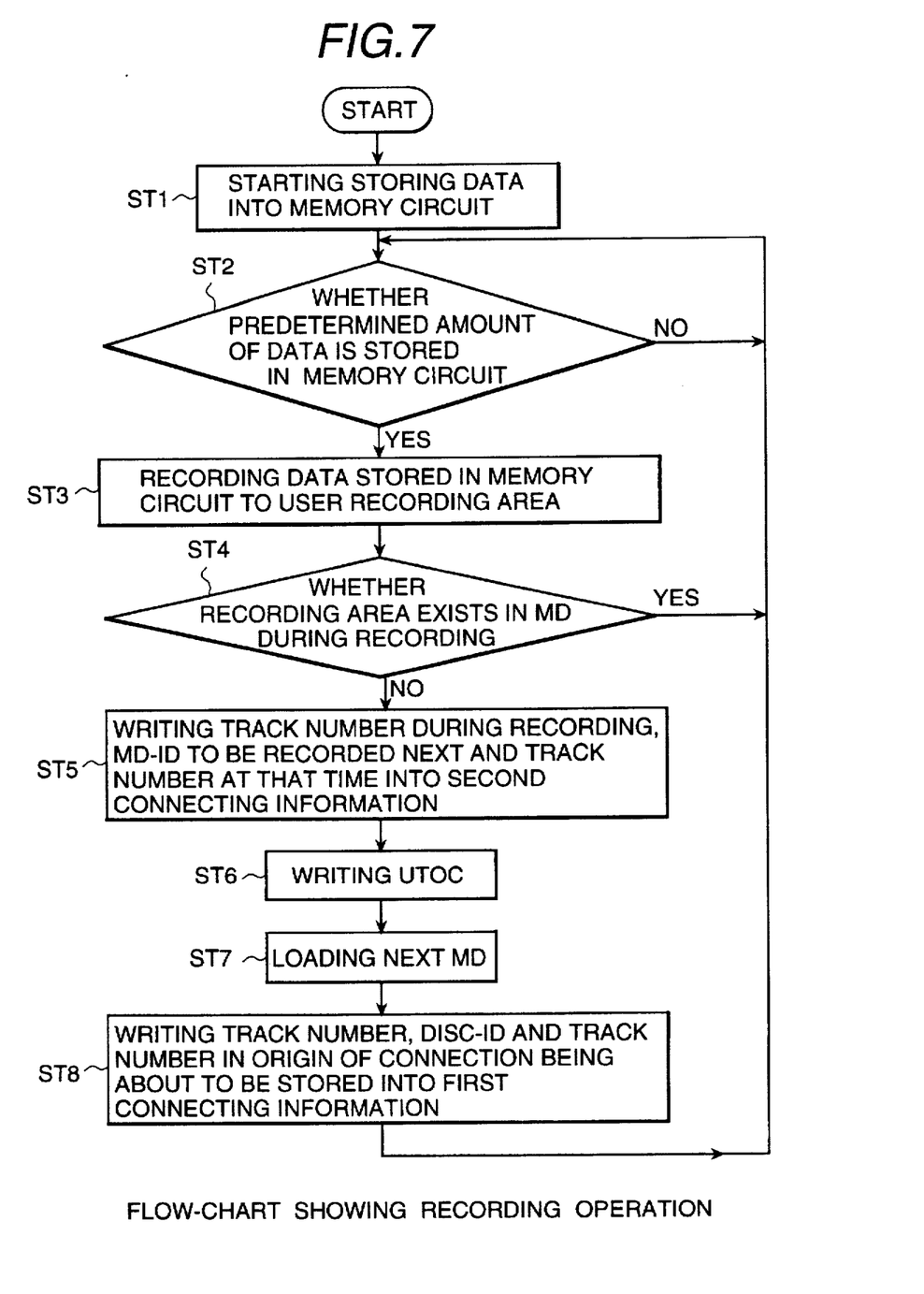
FIG. 7 is a flow-chart showing reading UTOC data of each MD and producing an MD management information table.

That is, in the flow-chart of FIG. 7, in the 1st step ST1, when a record starting button connected to the operating unit 20 shown in FIG. 1 is pushed, recording data signals, for example, sound signals is stored in the memory circuit 9 as compressed recording data through the path of the input terminal 14, the ADC 11, the ATRAC modulation/demodulation circuit 10, the memory controller 8 and the memory circuit 9.

In the 2nd step ST2, the system controller 15 judges whether a predetermined amount of recording data is accumulated in the memory circuit 9. Therefore, in the 2nd step ST2, the step outputs "YES", for example, every 2 seconds though it depends on the memory capacity of the memory circuit 9. If "NO", the processing is returned to the head portion of the 2nd step ST2.

In the 3rd step ST3, the recording data accumulated in the memory circuit 9 is recorded in the user memory area 1F of the MD 1.

In the 4th step ST4, the system controller 15 judges whether recording area exists in the MD 1 under recording. If "YES", the processing is returned to the head portion of the 2nd step ST2. If "NO", the processing proceeds to the 5th step ST5.

Now, assuming that the user recording area IF becomes full in the middle of recording the data in the fifth track.

Figure 8:
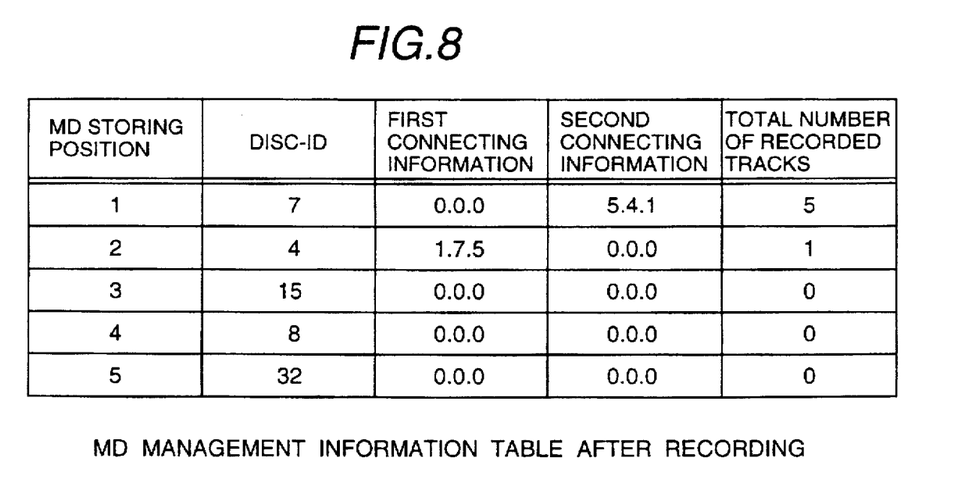
FIG. 8 is an explanatory figure showing an MD management information table after recording.

In the step ST5, the track number during recording now, that is, track number 5 in this case, and the MD-ID to be recorded next, that is, DISC-ID 4 in this case, and the track number at that time, that is, track number 1 in this case are written in the MD management information table as the second connecting information as shown in FIG. 8. The reason why DISC-ID 4 is selected in this case is that the plural MD's in the storage 21 are sequentially selected in order of 1 to 5, and the MD 1, for example, DISC-ID 4 in position of order of 2 to 5 is assumed to be a NO-track disc.

That is, (5, 4, 1) is written as the second connecting information of DISC-ID 7 having MD storing position of "1" of FIG. 8.

This means that the 5th track of the MD in the MD storing position "1" is connected to the 1st track of DISC-ID 4 in the MD storing position "2". At the same time, the same data is stored in the portion of the second connecting information area 34 in the format of Sector "0" of the UTOC 1E shown in FIG. 3.

Next, the processing proceeds to the 6th step ST6, the UTOC 1E of DISC-ID 7 is written.

After completion of the 6th step ST6, the processing proceeds to the 7th step ST7 while the data is being written because of being under recording operation, and the next Md is loaded from the MD storage 21. That is, in this case, DISC-ID 4 is loaded and the processing proceeds to the 8th step ST8.

In the 8th step ST8, the track number being about to be written with recording data, and the DISC-ID in origin of connection and the track number in origin of connection are written in the first connecting information table.

That is, track number 1 being about to be recorded and DISC-ID 7 in origin of connection and its track number 5 are written in DISC-ID 4 in the MD storing position 2 of FIG. 8 as the first connecting information. In FIG. 8, (1, 7, 5) is written in the first connecting information of DISC-ID 4. This means that the first track of the MD of DISC-ID 4 in the MD storing position "2" is connected from the track 5 of DISC-ID 7 in the MD storing position "1".

After completion of the 8th step ST8,the processing returns to the 2nd step ST2, and the data is recorded in the user area of the MD of DISC-ID 4. As described above, according to the recording operation,the MD's in the storing positions 1 and 2 can continuously record the data. Therein, the second connecting information of DISC-ID 4 remains (0, 0, 0) as the same as before. The data may be continuously recorded in the MD's 1 of DISC-ID 15 to DISC-ID 32 through the same operation as described above. Therefore, the data can be continuously recorded in different MD's.

As a countermeasure to protect a sound leap of an optical pickup, a conventional MD recording and reproducing apparatus has a shock-proof function in which a DRAM (Dynamic RAM) having, for example, a capacity of 1 mega-bits is used for the memory circuit 9 to store recording data of nearly 3 seconds in the DRAM, and the recording data is successively read out during sound leap. By the same principle as this, the accumulable time becomes approximately 10 seconds by using a 4 mega-bit DRAM as the memory circuit 9, and the accumulable time becomes approximately 45 seconds by using a 16 mega-bit DRAM. Therefore, the countermeasure for sound interruption in data recording for continuing the next MD can be performed by that the capacity of the memory circuit 9 is formed above 4 mega-bits, and an MD for successively and continuously recording the recording data is loaded the during the time period.

In other words, the data can be continuously recorded even when the MD is exchanged by performing the process from the 5th step ST5 to the 8th step ST8 in FIG. 7 within the time period. Since it is generally not special requirement to perform injecting and loading of MD 1 and unloading and loading of MD 1 within 5 to 7 seconds, the above operation can be easily realized.

A 16 mega-bit DRAM may be used as the memory circuit for a margin.

Figure 9:
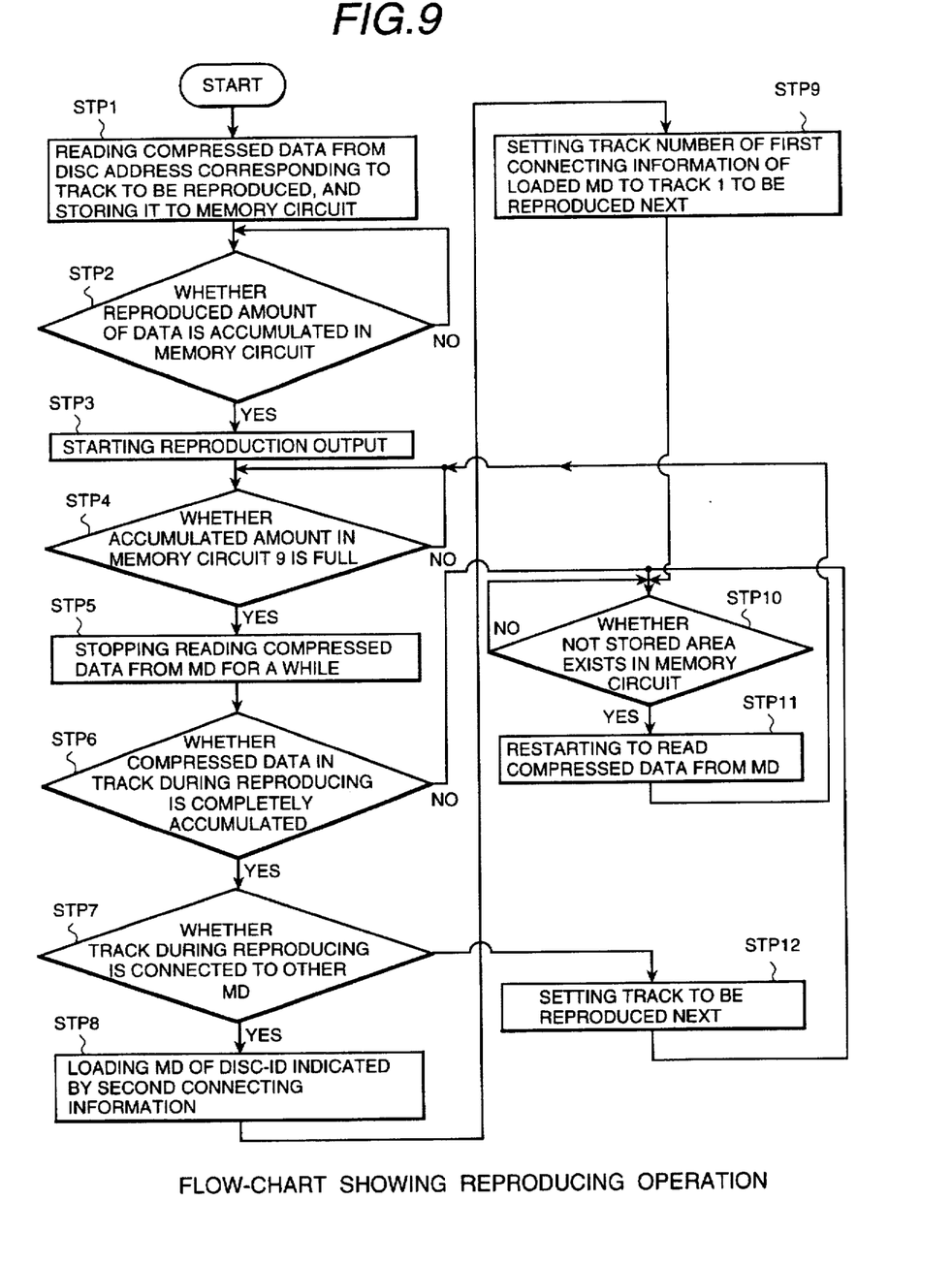
FIG. 9 is a flow-chart showing a reproducing operation of an optical medium recording and reproducing apparatus.

Track reproducing operation in the embodiment of the MD recording and reproducing apparatus will be described below, referring to FIG. 9. FIG. 9 is a flow-chart showing a reproducing operation of the present invention. As described before, description will be made on a case where the 5th track of DISC-ID 7 contained in the MD storing position "1" is reproduced.

In the 1st step STP1, compressed data is read from a disc address corresponding to the track 5 to be reproduced and stored in the memory circuit 9.

In the 2nd step STP2, the CPU of the system controller 15 judges whether a predetermined amount of data is accumulated in the memory circuit 9. If YES, the processing proceeds to the 3rd step STP3 to output the reproduced signals to the output terminal 13. The reproduction is started to output, and if the 2nd step STP2 is NO, the processing returns to the head of the 2nd step STP2.

In the 4th step STP4, the system controller 15 judges whether the accumulated amount in the memory circuit 9 is full or not. If the accumulated amount in the memory circuit 9 is full, that is, if YES, the processing proceeds to the 5th step STP5 and reading of the compressed data is stopped for a while so that the memory circuit 9 may not overflow. Until this point, the operation is the same as that of a conventional shock-proof memory.

In the 6th step STP6, the system controller 15 judges whether the compressed data in the track during reproducing is completely accumulated or not, and if NO, The processing proceeds to the 10th step STP10 and it is judged whether area to accumulating the data exists in the memory circuit 9 or not.

In the 10th step STP10, if there is accumulating area exists in the memory circuit 9, that is, if YES, the processing proceeds to the 11th step STP11, and the compressed data is continued to be stored in the memory circuit 9 again.

Since the output of the 11th step STP11 is returned to the head of the 4th step STP4, reading from and storing to the memory circuit 9 are intermittently performed when the memory circuit 9 becomes full.

In the 6th step STP6, if the data is completely accumulated in the memory circuit 9, that is, if YES, the processing proceeds to the 7th step STP7, and the system controller judges whether the track during reproducing is connected to another track of an MD.

If the 7th step STP7 is NO, the processing proceeds to the 12th step STP12 in the same way as before, and a track to be reproduced next is set, and the processing is returned to the head of the 10th step STP10 and the same operation is repeated in the route of the 11th step STP11 to the 4th step STP4 or to the 7th step STP7.

If the 7th step STP7 is YES, the processing proceeds to the 8th step STP8, a connected DISC-ID of the second connecting information is searched and the storing position containing the DISC-ID is detected. By using the aforementioned MD management information table described in FIG. 8, the connected DISC-ID4 is identified and the MD is loaded.

In the 9th step STP9, since it is identified that the first track is connected by reading the first connecting information of the loaded DISC-ID4, the track to be reproduced is set to 1 (one), and the processing is proceeded to the 10th step STP10 and the same operation is repeated in the route of the 11th step STP11, the 4th step STP4 to the 7th step STP7.

Since in the above reproducing operation the compressed data of the corresponding track of connected MD1 before the amount of data accumulated in the memory circuit 9 is eliminated as the process from the 7th step STP7 to the 9th step STP9 as the same as in the recording operation, the sound can be reproduced without interruption.

Figure 10:
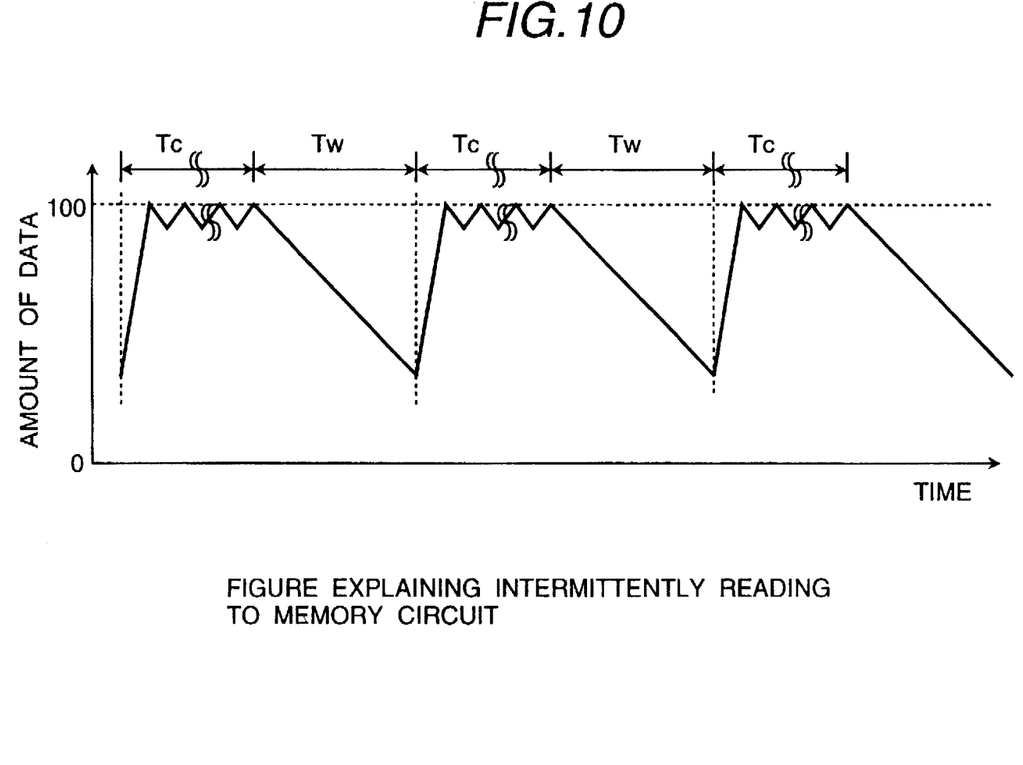
FIG. 10 is a flow-chart explaining intermittent reading to a memory circuit used in the present invention.

That is, referring to FIG. 10, letting the abscissa of the figure be data storing time to the memory circuit 9 and the ordinate be amount of stored data, data reading time period $T_c$ and standby time period $T_w$ are intermittently repeated. Therefore, an MD connected to another track is searched and loaded and the track number of the first connecting information is set to 1 within the standby time period.

In the present invention, the means for recording the first connecting information (ID indicating medium in origin of connection, track number in origin of connection and track number in destination of connection) and the second connecting information (ID indicating medium in destination of connection, track number in origin of connection and track number in destination of connection) indicating that the data is recorded over two or more media in the index information of media and performing continuous recording, and the means for reading the index information recorded in the media and performing continuous reproducing are provided. Thereby, since the data can be recorded over two or more media, long-time continuous recording and/or reproducing can be performed. Further, since connecting DISC-ID and track number are recorded in both the MD in origin of connection and the connected MD as a part of UTOC information, the next MD and the MD in origin of connection can be identified from the both sides.

Figure 11:
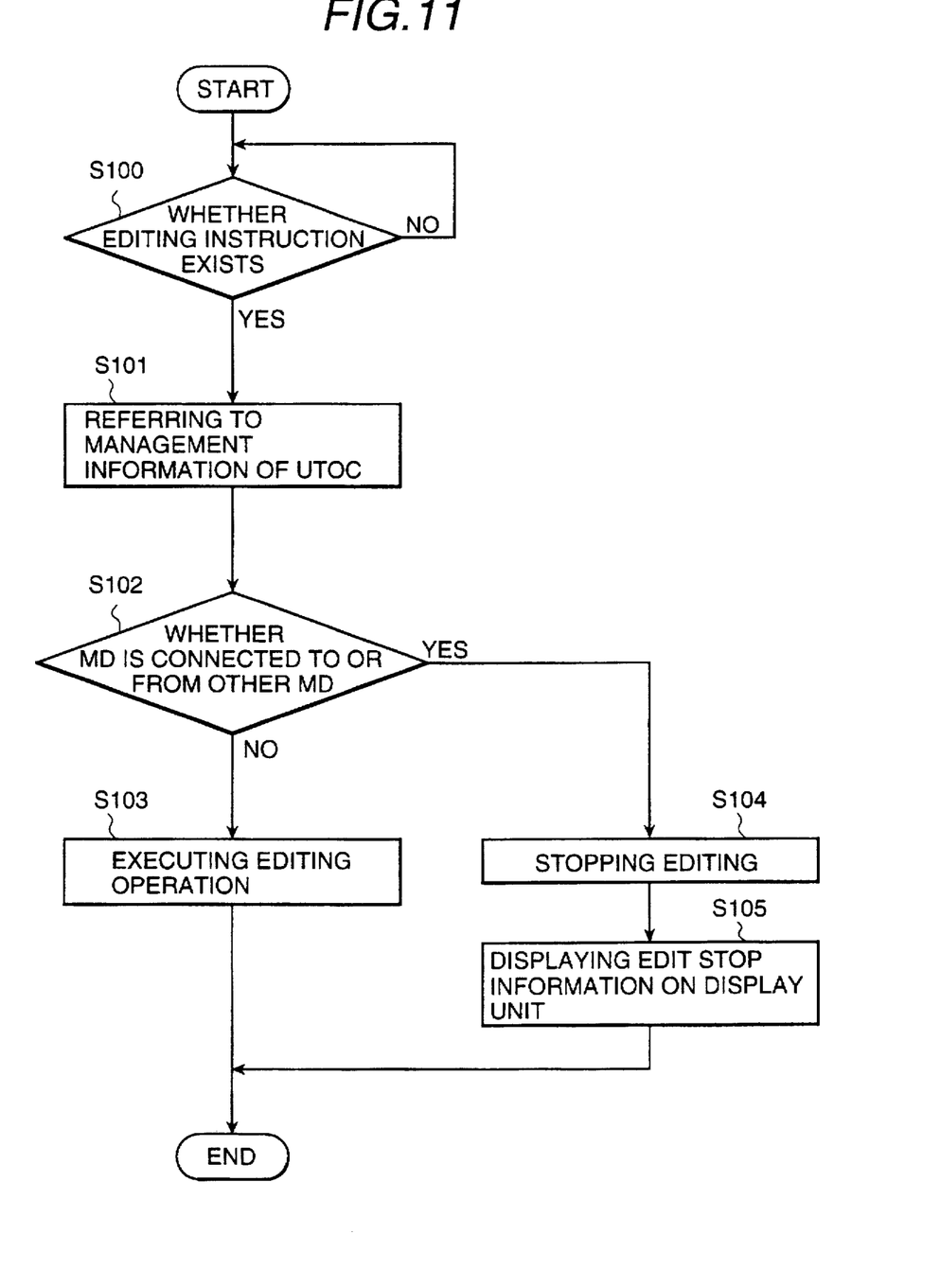
FIG. 11 is a flow-chart showing an editing operation of another embodiment of an optical recording and reproducing apparatus in accordance with the present invention.

FIG. 11 is a flow-chart showing an editing operation of another embodiment of an optical recording and reproducing apparatus in accordance with the present invention.

Description will be made on a case where either of the MD's of connected DISC-ID7 and DISC-ID4 described above is edited.

Editing here means operations of (1) deleting of a track, (2) connection between tracks, (3) separating of a track and (4) deleting of all tracks, and number of recorded tracks in a MD is changed by editing.

For example, in a case where the last track of the fifth track of DISC-ID7 described above is deleted, it is necessary to update both of the first connecting information and the second connecting information since the fifth track is connected to the first track of DISC-ID4.

In the present invention, the first connecting information and the second connecting are detected when the UTOC's are read from the MD's. If the inserted MD is connected to another MD, the editing is interrupted, and if the inserted MD is not connected to another MD, the editing is performed.

Referring to FIG. 11, in the step S100, it is judged whether an instruction of editing exists or not. If there is an instruction of editing (S100 is YES), the processing proceeds to the step S101. In the step S101, management information of UTOC of the inserted MD stored in a RAM of the microcomputer, not shown, in the system controller 15 is referred. In the step S102, it is judged whether the MD is connected to another MD or the MD is connected by another MD by examining the contents of the first connecting information and the second connecting using the management information of the index information (UTOC) of the MD. If the MD is not connected to another MD (S102 is NO), the processing proceeds to the step S103, and the system controller 15 executes the instructed editing process.

Therein, editing is performed as before, and the UTOC information is rewritten. If the MD is connected to another MD (S102 is YES), the system controller 15 rejects the instructed editing process (S104) and impossibility of the editing work is displayed on a display unit 19 such as a liquid display or a light-emitting diode display (S105). An alarm may be sounded by connecting a buzzer to the system controller 15.

As described above, editing is interrupted to an MD in which connecting information has been recorded in the index information, and editing is executed only when connecting information is not recorded.

In FIG. 1 of the system diagram of the recording and reproducing apparatus showing the embodiment in accordance with the present invention, the MD storage 25, the MD loading/unloading and loading/injecting portion 26, the loading/unloading and loading/injecting control circuit are provided to deal with a plurality of MD's. However, the recording and reproducing apparatus may be an apparatus dealing with only one MD.

According to the present invention, in a case of editing a recorded data block of an optical medium, it is judged whether the recorded data block to be edited is a recorded data block of the optical medium recorded over plural media. Therefore, erroneous editing can be avoided and operating error can be prevented. Accordingly, it is possible to provide a highly reliable optical medium recording and reproducing apparatus.

According to the present invention, in a case of editing a recorded data block of an optical medium, it is judged whether the recorded data block to be edited is a recorded data block of the optical medium recorded over plural media. If the recorded data block to be edited is a recorded data block of the optical medium recorded over plural media, impossibility of the editing work is displayed on a display unit in order to make the impossibility confirmed by sense of sight. Erroneous operation can be certainly prevented.

According to the present invention, it is possible to read information indicating that data is recorded over a plurality of mini-discs. Therefore, erroneous operation such as erroneous editing of mini-disc can be prevented.

What is claimed is:

1. A medium recording apparatus for recording a plurality of block of data in a user area of a medium and recording index information of said recorded data in an index area other than said user area of the medium, which comprises:

first recording means for recording first connecting information including information indicating that said recorded data is recorded over at least two of said media and information indicating the second medium to which connective data is recorded in said index area of the first medium;

second recording means for recording second connecting information including information indicating that connection from the first medium exists and information identifying the first medium in said index area of the second medium; and third recording means for successively recording the block of data on the first medium and the second medium.

2. A medium reproducing apparatus for reproducing index information recorded in an index area of the medium and reproducing recorded data recorded in a user area other than said index area of the media, which comprises:

first reading means for reading first connecting information including information indicating that said data is recorded over at least two of said media and information indicating the second medium to which connective data is recorded from said index area of the first medium;

second reading means for reading second connecting information including information indicating that connection from the first medium exists and information identifying the first medium from said index area of the second medium;

selecting means for selecting the second medium during reproducing said recorded data of the first medium; and reproducing means for continuously reproducing the recorded data of the first medium and the second medium selected by said selecting means.

3. A medium recording method for recording a plurality of block of data in a user area of a medium and recording index information of said recorded data in an index area other than said user area of the medium, the method comprises the steps of:

recording first connecting information including information indicating that said recorded data is recorded over at least two of said media and information indicating the second medium to which connective data is recorded in said index area of the first medium;

recording second connecting information including information indicating that connection from the first medium exists and information identifying the first medium in said index area of the second medium; and successively recording the block of data on the first medium and the second medium.

4. A medium reproducing method for reproducing index information recorded in an index area of a medium and reproducing recorded data recorded in a user area other than said index area of the media, the method comprises the steps of:

reading first connecting information including information indicating that said data is recorded over at least two of said media and information indicating the second medium to which connective data is recorded from said index area of the first medium;

reading second connecting information including information indicating that connection from the first medium exists and information identifying the first medium from said index area of the second medium;

selecting the second medium during reproducing said recorded data of the first medium; and continuously reproducing the recorded data of the first medium and the second medium selected by said selecting means.

5. A medium recording and reproducing apparatus according to any one of claim 1 and claim 2, which comprises:

means for reading said first connecting information and said second connecting information from said index information; and means for recording said first connecting information and said second connecting information in said index information.

6. A medium recording a plurality of block of data in a user area of a medium and recording index information of said recorded data in an index area other than said user area of the medium, which comprises:

first connecting information including information indicating that said recorded data is recorded over at least two of said media and information indicating the second medium to which connective data is recorded;

second connecting information including information indicating that connection from the first medium exists and information identifying the first medium; and at least one of said first connecting information and the second connecting information is recorded in said index area of the first medium.

7. A medium recording and reproducing apparatus comprising recording and reproducing means for recording to and reproducing from a medium and control means for editing such as deleting, connecting, separating and so on; said recording and reproducing means reproducing recorded data and connecting information including information indicating that said recorded data being recorded over at least two media from said medium;

said control means stopping said editing when a block of said data is recorded over at least two optical media based on said connecting information.

8. A medium recording and reproducing apparatus according to claim 7, which comprises display means for displaying that recorded block data is information recorded over a plurality of recording media.

9. A medium recording and reproducing apparatus according to any one of claim 7 and claim 8, wherein sound signal recorded data is recorded in and reproduing from a minidisc.

* * * * *